United States Patent
Chang et al.

(10) Patent No.: US 8,643,354 B2
(45) Date of Patent: Feb. 4, 2014

(54) MULTI-PHASE SWITCHING REGULATOR AND DRIVER CIRCUIT AND CONTROL METHOD THEREOF

(75) Inventors: Yu-Wei Chang, Pitou Township, Changhua County (TW); Yuan-Huang Cheng, Pingtung (TW); Ting-Hung Wang, Taipei (TW); Chia-Jung Lee, Toufen Township, Miaoli County (TW); Chung-Sheng Cheng, Zhubei (TW)

(73) Assignee: Richtek Technology Corporation, R.O.C., Chupei, Hsin-Chu (TW)

( * ) Notice: Subject to any disclaimer, the term of this patent is extended or adjusted under 35 U.S.C. 154(b) by 362 days.

(21) Appl. No.: 13/134,035

(22) Filed: May 26, 2011

(65) Prior Publication Data
US 2012/0176105 A1    Jul. 12, 2012

(30) Foreign Application Priority Data
Jan. 10, 2011 (TW) .............................. 100100864 A (51) Int. Cl.
G05F 1/40    (2006.01)

(52) U.S. Cl.
USPC .......................... 323/285; 323/271; 323/282

(58) Field of Classification Search
USPC .................. 323/268, 271, 282, 285
See application file for complete search history.

(56) References Cited

U.S. PATENT DOCUMENTS

| | | | |
|---|---|---|---|
| 6,414,470 B1 * | 7/2002 | Liu et al. | 323/272 |
| 6,670,794 B1 * | 12/2003 | Wang et al. | 323/213 |
| 7,023,182 B1 | 4/2006 | Kleine et al. | |
| 7,026,798 B2 * | 4/2006 | Cheung et al. | 323/225 |
| 2008/0272752 A1 | 11/2008 | Qiu et al. | |
| 2012/0262136 A1 * | 10/2012 | Nien et al. | 323/272 |
| 2013/0057239 A1 * | 3/2013 | Kalje et al. | 323/271 |

* cited by examiner

Primary Examiner — Matthew Nguyen
(74) Attorney, Agent, or Firm — Tung & Associates (57) ABSTRACT

The present invention discloses a multi-phase switching regulator, a driver circuit of a multi-phase switching regulator, and a control method of a multi-phase switching regulator. The multi-phase switching regulator includes: at least two power stages, switching power transistors in the power stages to convert an input voltage to an output voltage according to pulse width modulation (PWM) signals generated by corresponding PWM controllers respectively; and a current balance circuit, generating a current balance signal according to the current of the corresponding power stage and a phase adjustment signal to averagely distribute current over the active power stages. In the present invention, the gain of the current balance circuit is adjustable, to avoid or reduce output voltage overshoot and undershoot when the phase number changes, while the current balance function is still achieved in normal operation.

9 Claims, 6 Drawing Sheets

MULTI-PHASE SWITCHING REGULATOR AND DRIVER CIRCUIT AND CONTROL METHOD THEREOF

CROSS REFERENCE

The present invention claims priority to TW 100100864, filed on Jan. 10, 2011.

BACKGROUND OF THE INVENTION

1. Field of Invention

The present invention relates to a multi-phase switching regulator, a driver circuit of a multi-phase switching regulator and a control method of a multi-phase switching regulator, in particular to such multi-phase switching regulator, driver circuit and control method wherein the gain of a current balance circuit can be adjusted to avoid voltage overshoot and undershoot when the phase number of power stages is increased or decreased.

2. Description of Related Art

Figure 1:
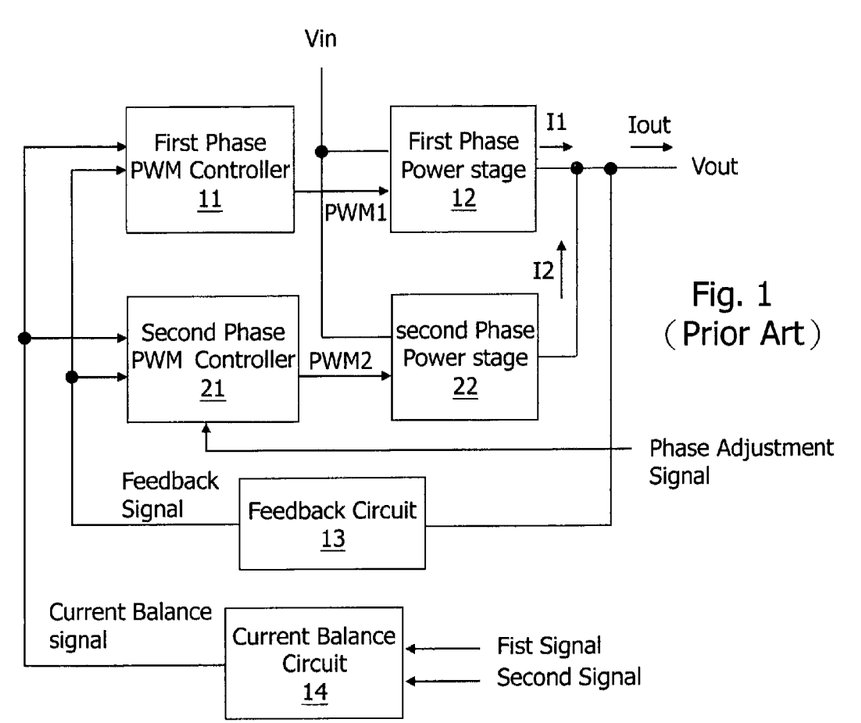
FIG. 1 shows a schematic diagram of a prior art multi-phase switching regulator.
Figure 2A:
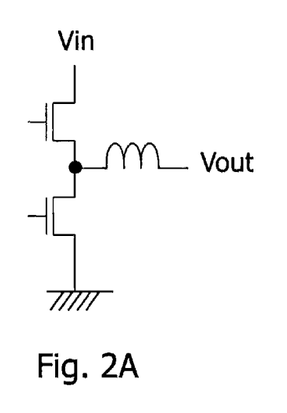
FIGS. 2A-2J show synchronous and asynchronous buck converters, boost converters, inverting converters, and buck-boost converters, respectively.
Figure 2B:
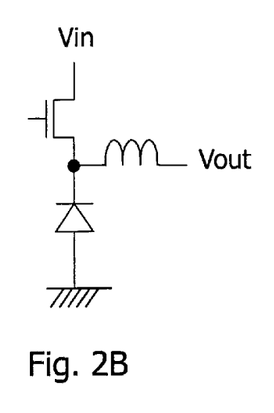
Figure 2C:
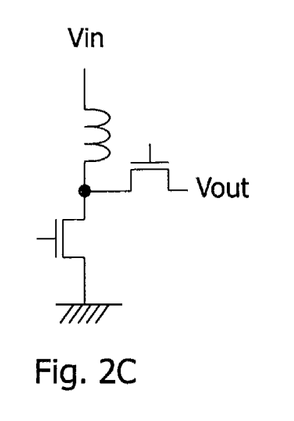
Figure 2D:
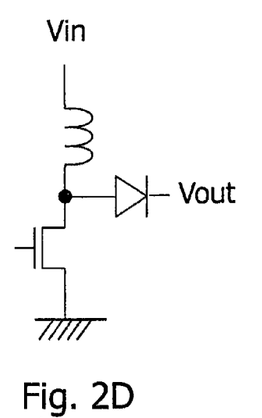
Figure 2E:
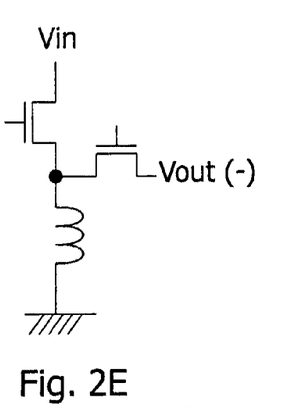
Figure 2F:
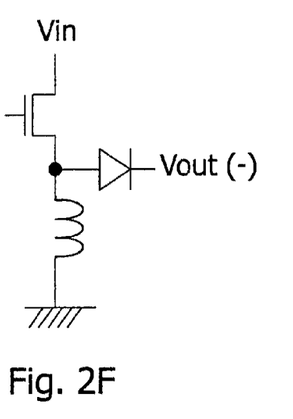
Figure 2G:
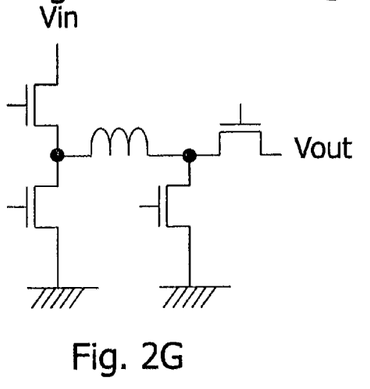
Figure 2H:
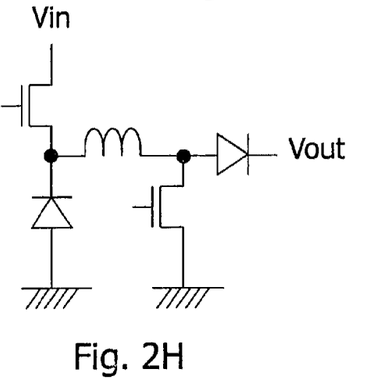
Figure 2I:
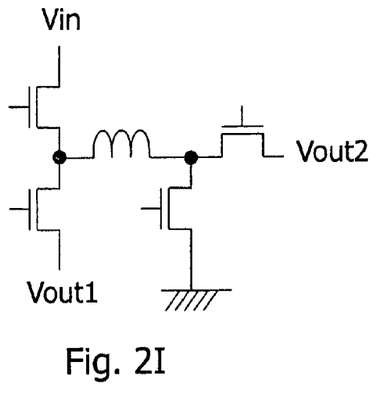
Figure 2J:
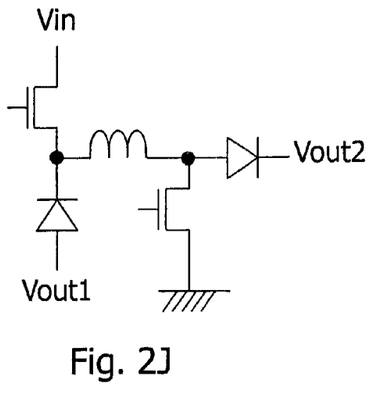

FIG. 1 shows a schematic diagram of a prior art multi-phase switching regulator. As shown in FIG. 1, a first phase PWM (pulse width modulation) controller 11 and a second phase PWM controller 21 respectively output a signal PWM1 and a signal PWM2 to control corresponding power transistors of a first phase power stage 12 and a second phase power stage 22 so that an input voltage Vin is converted to an output voltage Vout. A feedback circuit 13 generates a feedback signal related to the output voltage Vout and supplies the feedback signal to the first phase PWM controller 11 and the second phase PWM controller 21. A current balance circuit 14 receives a first signal related to a first inductor current I1 and a second signal related to a second inductor current I2, and outputs a current balance signal to the first phase PWM controller 11 and the second phase PWM controller 21. Accordingly, the first phase PWM controller 11 and the second phase PWM controller 21 respectively control the first phase power stage 12 and the second phase power stage 22 to balance the current I1 and the current I2, while the output current Iout is maintained at a desired target. The power stages 12 and 22 may be, for example but not limited to, synchronous or asynchronous power conversion circuits such as buck converters, boost converters, inverting converters, or buck-boost converters, as shown in FIGS. 2A-2J.

In light-load condition wherein relatively lower output current is required, not all of the power stages need be active to supply currents to the load. At least one power stage can be switched off (phase off) so as to reduce the operation loss of the circuit. When such a condition occurs, the prior art method instantly and completely switches off the second phase power stage 22. That is, a phase off signal is inputted to the second phase PWM controller 21 so that the duty ratio of the signal PWM2 immediately drops to zero. However, it requires a period of time for the current I1 of the first phase power stage 12 to reach to a level required by the load. This causes an undershoot in the output voltage and easily result in system crash or other problems.

U.S. patent publication No. 2008/0272752 discloses a multi-phase switching regulator which can switch off an operating power stage while maintaining the output voltage. However, this prior art can be applied only to a multi-phase switching regulator with at least three phases. In addition, when a power stage is to be switched off, its corresponding PWM signal is added to the PWM signal of the first phase power stage. Thus, output voltage undershoot will still occur because there is a limit for the power stages remain operating to ramp up their currents.

On the other hand, when the load becomes heavy and requires relatively higher output current, the circuit needs to restore one or more power stages which are previously switched off, so as to supply more current to the load. That is, a "phase on" operation is needed (i.e., at least one inactive power stage needs to be switched on). When such a condition occurs, the prior art switches on the second phase power stage 22 (assuming that the second phase power stage 22 has been switched off previously); a phase on signal is inputted to the second phase PWM controller 21 to activate the second phase power stage 22, and the current balance circuit 14 starts to detect the inductor currents of the operating phases, and outputs a current balance signal to the controllers of the operating phases for current balance. However, in the transition period when a previously inactive power stage is just switched on, the inductor currents of the operating power stages are certainly higher than the target values for current balance, so the current balance circuit 14 will reduce the currents of these power stages. Consequently, the output current, which is the sum of all inductor currents of all phases, is not sufficient to support what is required by the load, and hence an output voltage undershoot often occurs during such transition period to cause system crash or other problems.

U.S. Pat. No. 7,023,182 discloses a multi-phase control system which forces the duty ratio of the PWM signal outputted from a PWM controller to be increased or decreased according to a signal relating to output current. The duty ratio of a power stage which is newly activated is increased by a fixed amount, while the duty ratio of an operating power stage is decreased by a fixed amount, to improve the output voltage undershoot resulting from activating a new phase. It is not flexible to force the duty ratios to be increased or decreased in this manner, and the output voltage undershoot still cannot be completely avoided.

In view of above, the present invention overcomes the foregoing drawbacks by providing a multi-phase switching regulator and a driver circuit and a control method therefor, wherein the gain of a current balance circuit is adjusted to avoid voltage overshoot and undershoot when the phase number of power stages is increased or decreased.

SUMMARY OF THE INVENTION

An objective of the present invention is to provide a multi-phase switching regulator.

Another objective of the present invention is to provide a driver circuit for a multi-phase switching regulator.

Another objective of the present invention is to provide a method for controlling a multi-phase switching regulator.

To achieve the foregoing objectives, in one aspect, the present invention provides a multi-phase switching regulator which comprises: a first phase power stage switching at least one first power transistor according to a first phase PWM signal; at least one second phase power stage respectively switching at least one corresponding second power transistor of the second phase power stage according to a second PWM signal and converting an input voltage to an output voltage together with the first phase power stage; a feedback circuit generating a feedback signal according to the output voltage; a first phase PWM controller generating the first phase PWM signal according to the feedback signal and adjusting the first phase PWM signal according to a current balance signal; at least one second phase PWM controller generating the at least one second phase PWM signal according to the feedback signal, adjusting the at least one second phase PWM signal according to the current balance signal, and receiving a phase adjustment signal to determinate the number of the second phase power stages which are active or inactive; and a current balance circuit generating the current balance signal according to a first signal related to a current outputted by the first phase power stage and at least one second signal related to a current outputted by the at least one second phase power stage, wherein the current balance circuit is controlled by the phase adjustment signal to inactivate the current balance circuit or reduce a gain of the current balance circuit.

In another aspect, the present invention provides a driver circuit of a multi-phase switching regulator, the multi-phase switching regulator switching at least one power transistor of a first phase power stage and at least one power transistor of at least one second phase power stage according to a first phase PWM signal and at least one second phase PWM signal, respectively, to convert an input voltage to an output voltage and generating a feedback signal according to the output voltage, the driver circuit comprising: a first phase PWM controller generating the first phase PWM signal according to the feedback signal and adjusting the first phase PWM signal according to a current balance signal; at least one second phase PWM controller generating the at least one second phase PWM signal according to the feedback signal, adjusting the at least one second phase PWM signal according to the current balance signal, and receiving a phase adjustment signal to determinate the number of the second phase power stages which are active or inactive; and a current balance circuit generating the current balance signal according to a first signal related to a current outputted by the first phase power stage and at least one second signal related to a current outputted by the at least one second phase power stage, wherein the current balance circuit is controlled by the phase adjustment signal to inactivate the current balance circuit or reduce a gain of the current balance circuit.

In the foregoing multi-phase switching regulator or the foregoing driver circuit, the gain is preferably reduced to zero or approximate zero when the current balance circuit receives the phase adjustment signal.

In yet another aspect, the present invention provides a control method of a multi-phase switching regulator, the multi-phase switching regulator switching at least one power transistor of a first phase power stage and at least one power transistor of at least one second phase power stage according to a first PWM signal and at least one second phase PWM signal, respectively, to convert an input voltage to an output voltage and generating a feedback signal according to the output voltage, the control method comprising: generating the first phase PWM signal according to the feedback signal and adjusting the first phase PWM signal according to a current balance signal; generating the at least one second phase PWM signal according to the feedback signal, adjusting the at least one second phase PWM signal according to the current balance signal, and receiving a phase adjustment signal to determinate the number of the second phase power stages which are active or inactive; generating the at least one second phase PWM signal according to the feedback signal and adjusting the at least one second phase PWM signal according to the current balance signal; generating the current balance signal according to a first signal related to a current outputted by the first phase power stage and at least one second signal related to a current outputted by the at least one second phase power stage, wherein the current balance signal has a gain; receiving a phase adjustment signal to determinate the number of the second phase power stages which are active or inactive; and stopping providing the current balance signal or reducing the gain of the current balance signal according to the phase adjustment signal.

When the output voltage becomes stable or after a predetermined period of time after the phase adjustment transition, the gain of the current balance circuit can be restored to a predetermined value.

The objectives, technical details, features, and effects of the present invention will be better understood with regard to the detailed description of the embodiments below, with reference to the drawings.

DESCRIPTION OF THE PREFERRED EMBODIMENTS

The basic concept of the present invention is as follows: when the multi-phase switching regulator switches between a light load condition and a heavy load condition (i.e., the number of active power stages need to be increased or reduced), the current balance circuit 14 is inactivated or the gain of the current balance circuit 14 is adjusted according to a phase adjustment signal, so that the output currents of the power stages which are about to be activated or inactivated are increased or decreased gradually, to avoid output voltage undershoot that will adversely affect the operation of the system.

Figure 3:
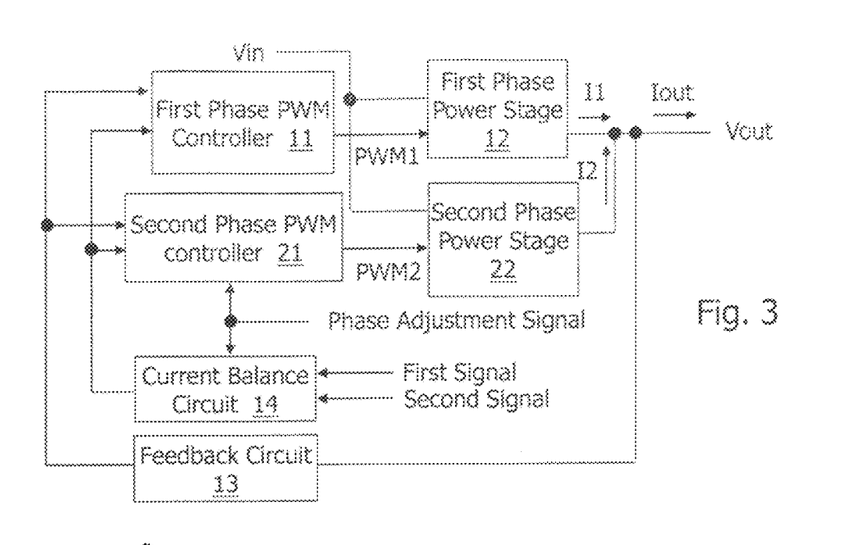
FIG. 3 shows an embodiment of the present invention, illustrating a basic configuration.

FIG. 3 shows an embodiment of the present invention, illustrating a basic configuration. In this embodiment, the first phase power stage 12 and the second phase power stage 22 may be, for example but not limited to, a synchronous or asynchronous buck converter, boost converter, inverting converter, or buck-boost converter as shown in FIG. 2A-2J. For simplicity in explaining the spirit of the invention, we assume that the second phase power stage 22 is the phase to be activated or inactivated as the phase number is increased or decreased. But certainly, it can be the first phase power stage 12 that is to be activated or inactivated, or the first phase power stage 12 and the second phase power stage 22 are alternately activated or inactivated. In FIG. 3, the first phase PWM controller 11 and the second PWM controller 21 respectively output a signal PWM1 and a signal PWM2 to control at least one power transistor of the first phase power stage 12 and at least one power transistor of the second phase power stage 22; collectively, they convert an input voltage Vin to an output voltage Vout. A feedback circuit 13 generates a feedback signal related to the output voltage Vout, and inputs the feedback signal to the first phase PWM controller 11 and the second PWM controller 21. A current balance circuit 14 receives a first signal related to a first inductor signal I1 and a second signal related to a second inductor signal I2, and outputs a current balance signal which is sent to the first phase power stage 12 and the second phase power stage 22. According to the current balance signal, the first phase PWM controller 11 and the second phase PWM controller 21 respectively control the first phase power stage 12 and the second phase power stage 22 such that the current I1 and the current I2 are balanced, while the output current Iout is regulated at a desired target.

The present invention is different from the prior art in that: the phase adjustment signal is inputted not only to the second phase PWM controller 21 but also to the current balance circuit 14. The current balance circuit 14 is inactivated or its gain is adjusted according to the phase adjustment signal, to avoid the output voltage undershoot during the transition of phase adjustment.

Figure 4A:
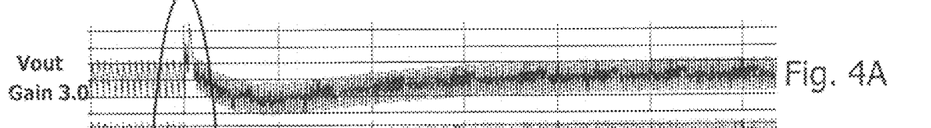
FIGS. 4A-4D show schematic waveform diagrams of output voltages under the various gains of the current balance circuit.
Figure 4B:
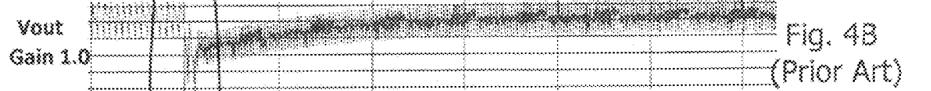
Figure 4C:
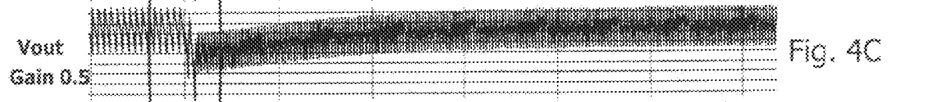
Figure 4D:
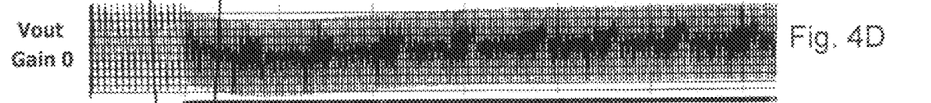
Figure 4E:
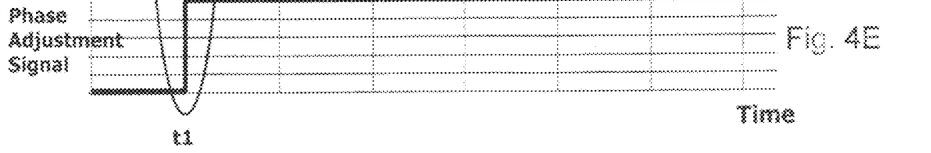
FIG. 4E shows a schematic waveform diagram of a phase adjustment signal.
Figure 5A:
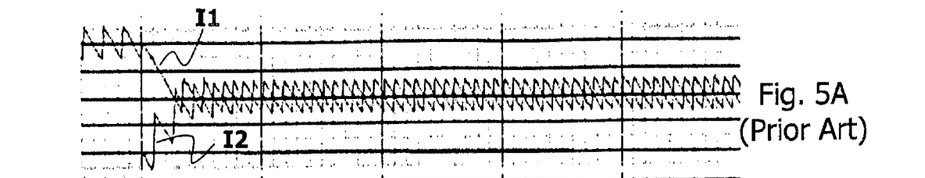
FIGS. 5A-5B show schematic waveform diagrams of output currents as the gain of the current balance circuit is 1.0.
Figure 5B:
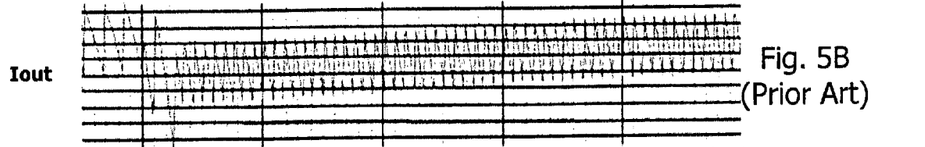
Figure 5C:
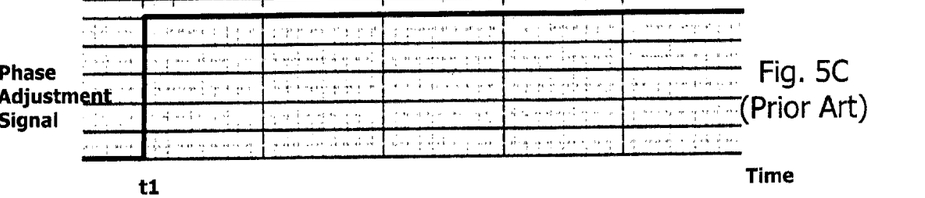
FIG. 5C shows a schematic waveform diagram of a phase adjustment signal.

The advantages of the present invention will be explained in the following, by taking a phase on (add phase) case as an example. FIG. 4B and FIGS. 5A-5C show the disadvantage of the prior art. As shown in FIG. 4E and FIG. 5C, at time t1, the phase adjustment signal generates a corresponding waveform to activate the second phase power stage 22, so the second phase power stage 22 becomes active and the current balance circuit 14 immediately starts to operate. In the prior art, the gain of the current balance circuit is 1.0, so the output current I1 of the first phase power stage has a waveform as shown by I1 in FIG. 5A, and the output current I2 of the second phase power stage has a waveform as shown by I2 in FIG. 5A. As shown in the figure, due to the effect of the current balance circuit 14, an undershoot occurs in the first phase output current I1. The undershoot also occurs in the total output current Iout because the total output current Iout is the sum of the first phase output current I1 and the second phase output current I2, as shown in FIG. 5B. Referring to FIG. 4B, an undershoot also occurs in the output voltage Vout at this moment. The reason for the undershoot is that, for current balance purpose, the current balance circuit 14 provides each phase with a target current value at balance. The output current I1 as the first phase power stage is operating before the phase on transition is very much higher than the target current value at balance, so the first phase power stage immediately reduces the output current I1 during the phase on transition. However, at this moment, the output current I2 of the second phase power stage has not yet reached its target current value at balance. Consequently, the sum of the currents cannot meet the requirement by the load, so the output voltage undershoot occurs.

Referring to FIGS. 4A-4E, the gain of the current balance circuit is set to 3.0, 1.0, 0.5, and 0 in each case of FIGS. 4A-4D, while FIG. 4E shows a schematic waveform diagram of a phase adjustment signal. As shown in the figures, when the gain of the current balance circuit is set to 3.0, the output voltage Vout will overshoot. The undershoot occurring in the output voltage Vout when the gain is 0.5 is slightly improved, as compared with the case that the gain is 1.0. When the gain is 0, or the current balance circuit 14 is inactivated, no undershoot is found in the output voltage Vout; this is the best case. Therefore, according to the present invention, the current balance circuit 14 is preferably inactivated or the gain of the current balance circuit 14 is preferably reduced during the transition of phase adjustment.

Figure 6A:
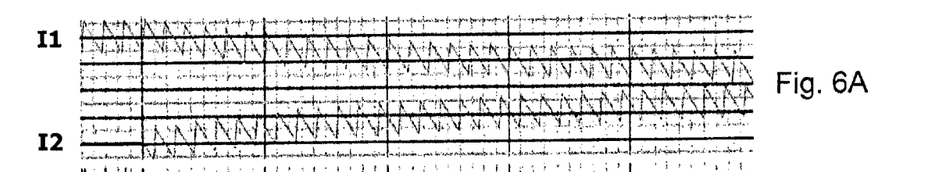
FIGS. 6A-6B show schematic waveform diagrams of output voltages as the gain of the current balance circuit is 0.
Figure 6B:
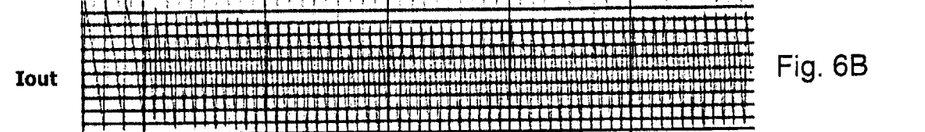
Figure 6C:
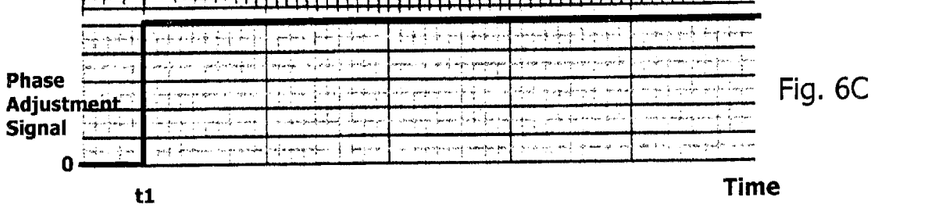
FIG. 6C shows a schematic waveform diagram of a phase adjustment signal.

FIGS. 6A-6C show schematic waveform diagrams of output currents as the gain of the current balance circuit is 0. As shown in FIG. 6C, at time t1, the phase adjustment signal generates a corresponding waveform to activate the second phase power stage 22. As the gain of the current balance circuit is 0, the output current I1 of the first phase power stage has a waveform as shown by I1 in FIG. 6A and the output current I2 of the second phase power stage has a waveform as shown by I2 in FIG. 6A. FIG. 6B shows the total output current Iout. Referring to FIG. 6A, the first phase output current I1 gradually and slowly decreases. No undershoot occurs in the output current Iout as shown in FIG. 6B. Further referring to FIG. 4D, the output voltage Vout also has no undershoot. In view of above, to obtain a better result, the gain of the current balance circuit is preferably set to 0 or approximate 0, or the current balance circuit 14 is inactivated during the transition of phase on. However, even if the current balance circuit 14 is not completely inactivated (i.e., the gain of the current balance circuit 14 is reduced to 0), as long as the gain of the current balance circuit 14 is reduced, output voltage undershoot can be alleviated. Hence, the scope of the present invention should cover any range of reducing the gain of the current balance circuit.

The above example shows that the current balance circuit 14 is inactivated or the gain of the current balance circuit is reduced during the transition of phase on. The inventors of the present invention also found that during the transition of phase off, output voltage overshoot or undershoot can also be eliminated or alleviated if the current balance circuit 14 is inactivated or the gain of the current balance circuit is reduced.

The current balance circuit 14 is inactivated or the gain of the current balance circuit is reduced for a period of time after the transition of phase adjustment (phase on or phase off). Once the output voltage becomes stable, the gain of the current balance circuit can be restored to a predetermined proper value (e.g., 1.0 or other values) for balancing the output currents of the operating phases. The time t2 (referring to FIGS. 8A-8F which are to be described later) for the gain of the current balance circuit to be restored to a predetermined proper value can be set at a time point after a predetermined period after the time t1 (time t1 is when phase adjustment starts). Or, the time t2 can be set at a time point when it is detected that the output current of one phase reaches (rises or falls to) a predetermined value (e.g., within a range near the current value at balance).

Figure 7A:
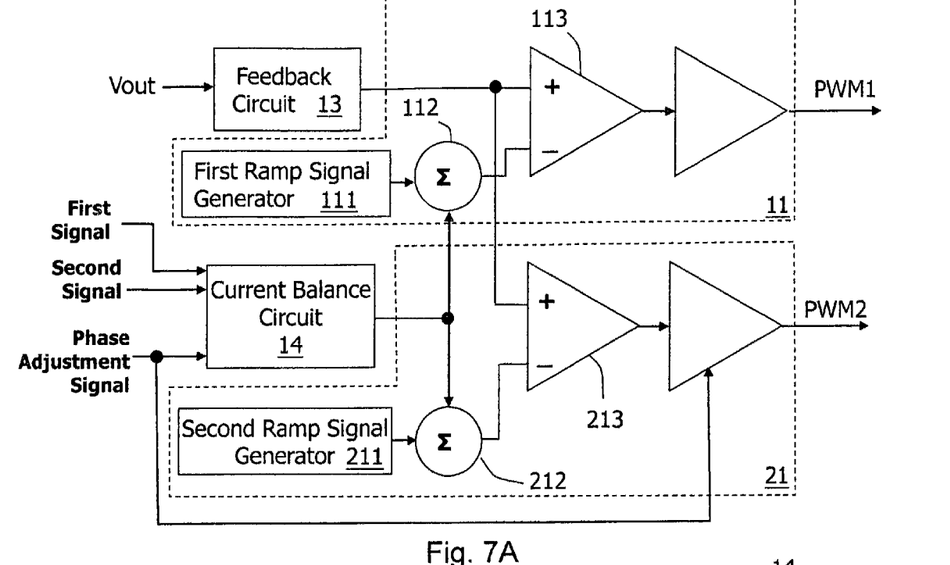
FIG. 7A shows an embodiment illustrating an example as to how the phase adjustment signal activates or inactivates a second phase power stage.

FIG. 7A shows an embodiment illustrating an example as to how the phase adjustment signal activates or inactivates a second phase power stage. As shown in this figure, the first phase PWM controller 11 comprises a first ramp signal generator 111, a summing circuit 112, and a comparator 113. The first ramp signal generator 111 generates a first ramp signal as an input of the summing circuit 112. The summing circuit 112 adds the first ramp signal and the current balance signal generated from the current balance circuit 14 to generate a first sum, as an input of the comparator 113. The comparator 113 compares the first sum with the feedback signal generated from the feedback circuit 13 to generate the fist phase PWM signal PWM1. The second phase PWM controller 21 comprises a second ramp signal generator 211, a summing circuit 212, and a comparator 213. The second ramp signal generator 211 generates a first ramp signal as an input of the summing circuit 212. The summing circuit 112 adds the first ramp signal and the current balance signal generated from the current balance circuit 14 to generate a second sum result, as an input of the comparator 213. The comparator 213 compares the second sum result with the feedback signal generated from the feedback circuit 13 to generate the second phase PWM signal PWM2. The phase adjustment signal is supplied not only to the second phase PWM controller 21 but also to the current balance circuit 14.

Figure 7B:
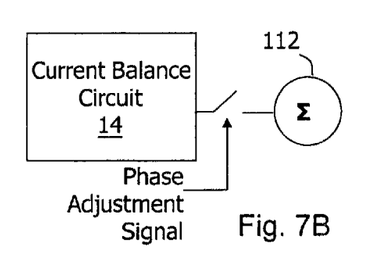
FIGS. 7B-7C show embodiments of the current balance circuit.
Figure 7C:
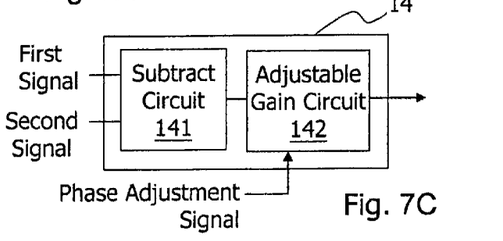
Figure 8A:
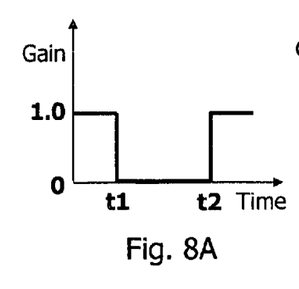
FIGS. 8A-8F show several patterns for adjusting the gain of the current balance circuit.
Figure 8B:
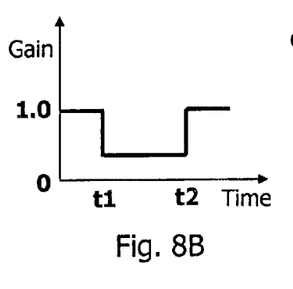
Figure 8C:
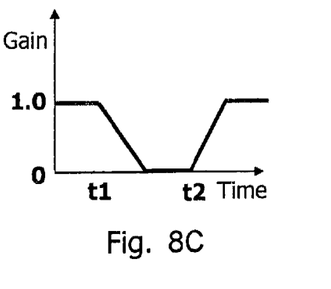
Figure 8D:
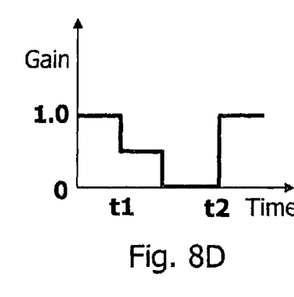
Figure 8E:
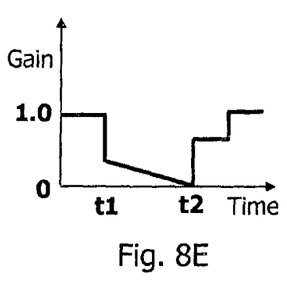
Figure 8F:
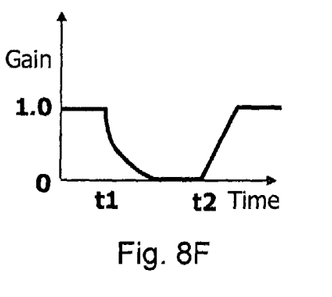

When the phase adjustment signal starts to activate or inactivate the second phase, in one embodiment, the current balance circuit 14 is inactivated; this can be achieved by, for example, disabling the current balance circuit 14, or in an equivalent way, cut off its output signal as shown in FIG. 7B. In another embodiment, the gain of the current balance circuit 14 is reduced, which for example can be achieved as shown in FIG. 7C. The current balance circuit 14 of this embodiment comprises a subtract circuit 141 and an adjustable gain circuit 142. The subtract circuit 141 obtains the difference between the first signal and the second signal, and the adjustable gain circuit 142 amplifies the difference. In the present embodiment, the gain of the adjustable gain circuit 142 is adjustable by the phase adjustment signal, so that the gain of the current balance circuit 14 is reduced during the transition period of phase adjustment. In a likely manner, if the gain of the current balance circuit 14 is reduced to 0, it is equivalent to inactivating the current balance circuit 14.

Referring to FIGS. 8A-8F, as stated in the above, the undershoot/overshoot problems in the prior art can be eliminated or alleviated by inactivating the current balance circuit 14 or reducing the gain of the current balance circuit. With respect to the latter, there are various ways to adjust and reduce the gain of the current balance circuit; they should all be included in the scope of the present invention. What FIGS. 8A-8F show are only several examples of them. As shown in FIGS. 8A-8F, at time t1 in the beginning of the phase adjustment, the gain of the current balance circuit 14 can be directly tuned to 0 or a certain value, or can be decreased in a linear or nonlinear manner. At time t2 when the output voltage Vout is stable or near stable, the gain of the current balance circuit 14 can be directly adjusted back to the predetermined proper value, or can be increased to the value in a linear or nonlinear manner.

Figure 9:
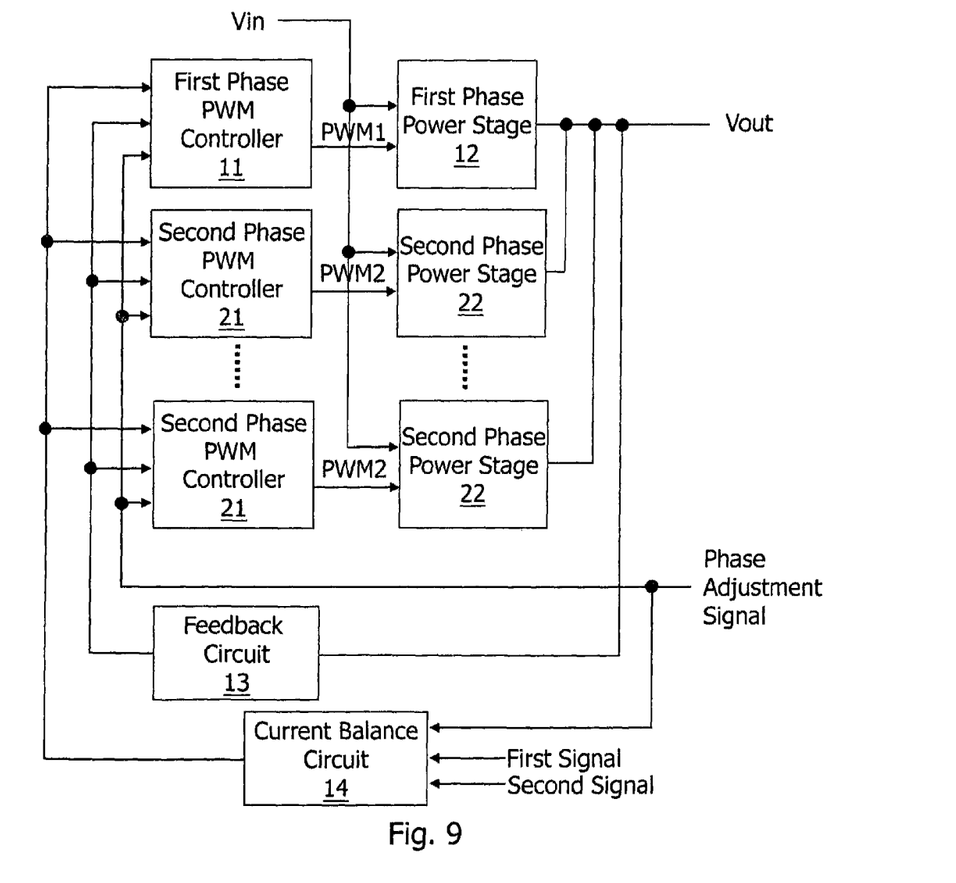
FIG. 9 shows another embodiment of the present invention, illustrating a basic configuration.

FIG. 9 shows another embodiment of the present invention, illustrating a basic configuration. The figure shows another application of the present invention, to a three (or more) phase multi-phase switching regulator. The multi-phase switching regulator according to this embodiment comprises multiple second phase PWM controllers 21, which are controlled in a manner similar to the above embodiments wherein there is only one single second phase PWM controller 21. The phase adjustment signal is supplied not only to the second phase PWM controllers 21 for determining the number of the second phase power stages to be activated or inactivated, but also to the current balance circuit 14. When one or several of the second phase PWM controllers 21 need to be inactivated, the current balance circuit 14 is inactivated, or the gain of the current balance circuit 14 is reduced according to the phase adjustment signal, so that the function of the current balance circuit 14 does not adversely affect the output voltage during the transition period of phase adjustment.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, in all of the embodiments, a device or circuit which does not affect the major functions of the signals, such as a switch, etc., can be added between two circuits illustrated to be directly connected with each other. The meanings of the high level and low level of a digital signal are interchangeable; for example, the phase adjustment operation can be triggered by the low level instead of high level of the phase adjustment signal. For another example, the positive and negative terminals of the comparators 113 and 213 are interchangeable, with corresponding amendment to the processing of their output signals. Thus, the present invention should cover all such and other modifications and variations, which should be interpreted to fall within the scope of the following claims and their equivalents.

What is claimed is:

1. A multi-phase switching regulator, comprising:
 a first phase power stage switching at least one first power transistor according to a first phase pulse width modulation (PWM) signal;
 at least one second phase power stage respectively switching at least one corresponding second power transistor of the second phase power stage according to a second PWM signal and converting an input voltage to an output voltage together with the first phase power stage;
 a feedback circuit generating a feedback signal according to the output voltage;
 a first phase PWM controller generating the first phase PWM signal according to the feedback signal and adjusting the first phase PWM signal according to a current balance signal;
 at least one second phase PWM controller generating the at least one second phase PWM signal according to the feedback signal, adjusting the at least one second phase PWM signal according to the current balance signal, and receiving a phase adjustment signal to determinate the number of the second phase power stages which are active or inactive; and
 a current balance circuit generating the current balance signal according to a first signal related to a current outputted by the first phase power stage and at least one second signal related to a current outputted by the at least one second phase power stage, wherein during a transition of phase adjustment, the current balance circuit is inactivated or its gain is reduced according to the phase adjustment signal, thereby avoiding an undershoot in the output voltage.

2. The multi-phase switching regulator of claim 1, wherein the gain is reduced to zero or approximate zero when the current balance circuit receives the phase adjustment signal.

3. The multi-phase switching regulator of claim 1, wherein the first phase power stage and the second phase power stage are synchronous or asynchronous buck converters, boost converters, inverting converters, or buck-boost converters.

4. A driver circuit of a multi-phase switching regulator, the multi-phase switching regulator switching at least one power transistor of a first phase power stage and at least one power transistor of at least one second phase power stage according to a first pulse width modulation (PWM) signal and at least one second phase PWM signal, respectively, to convert an input voltage to an output voltage and generating a feedback signal according to the output voltage, the driver circuit comprising:

a first phase PWM controller generating the first phase PWM signal according to the feedback signal and adjusting the first phase PWM signal according to a current balance signal;

at least one second phase PWM controller generating the at least one second phase PWM signal according to the feedback signal, adjusting the at least one second phase PWM signal according to the current balance signal, and receiving a phase adjustment signal to determinate the number of the second phase power stages which are active or inactive; and a current balance circuit generating the current balance signal according to a first signal related to a current outputted by the first phase power stage and at least one second signal related to a current outputted by the at least one second phase power stage, wherein during a transition of phase adjustment, the current balance circuit is inactivated or its gain is reduced according to the phase adjustment signal, thereby avoiding an undershoot in the output voltage.

5. The driver circuit of a multi-phase switching regulator of claim 4, wherein the gain is reduced to zero or approximate zero when the current balance circuit receives the phase adjustment signal.

6. The driver circuit of a multi-phase switching regulator of claim 4, wherein the first phase power stage and the second phase power stage are synchronous or asynchronous buck converters, boost converters, inverting converters, or buck-boost converters.

7. A control method of a multi-phase switching regulator, the multi-phase switching regulator switching at least one power transistor of a first phase power stage and at least one power transistor of at least one second phase power stage according to a first pulse width modulation (PWM) signal and at least one second phase PWM signal, respectively, to convert an input voltage to an output voltage and generating a feedback signal according to the output voltage, the control method comprising:

generating the first phase PWM signal according to the feedback signal and adjusting the first phase PWM signal according to a current balance signal;

generating the at least one second phase PWM signal according to the feedback signal, adjusting the at least one second phase PWM signal according to the current balance signal, and receiving a phase adjustment signal to determinate the number of the second phase power stages which are active or inactive;

generating the at least one second phase PWM signal according to the feedback signal and adjusting the at least one second phase PWM signal according to the current balance signal;

generating the current balance signal according to a first signal related to a current outputted by the first phase power stage and at least one second signal related to a current outputted by the at least one second phase power stage, wherein the current balance signal has a gain;

receiving a phase adjustment signal to determinate the number of the second phase power stages which are active or inactive; and stopping providing the current balance signal or reducing the gain of the current balance signal according to the phase adjustment signal during a transition of phase adjustment, thereby avoiding an undershoot in the output voltage.

8. The control method of a multi-phase switching regulator of claim 7, wherein the first phase power stage and the second phase power stage are synchronous or asynchronous buck converters, boost converters, inverting converters, or buck-boost converters.

9. The control method of a multi-phase switching regulator of claim 7, further comprising:

restoring the gain of the current balance circuit to a predetermined value after stopping providing the current balance signal or reducing the gain of the current balance signal for a predetermined period of time.

* * * * *